(12) United States Patent
Pradhan et al.

(10) Patent No.: US 11,995,470 B2
(45) Date of Patent: May 28, 2024

(54) SECURE RESOURCE MANAGEMENT TO PREVENT RESOURCE ABUSE

(71) Applicant: EQUIFAX INC., Atlanta, GA (US)

(72) Inventors: Ligaj Pradhan, Atlanta, GA (US); Piyush Patel, Peachtree City, GA (US); Rajkumar Bondugula, Irving, TX (US)

(73) Assignee: Equifax Inc., Atlanta, GA (US)

( * ) Notice: Subject to any disclaimer, the term of this patent is extended or adjusted under 35 U.S.C. 154(b) by 0 days.

(21) Appl. No.: 17/634,825

(22) PCT Filed: Sep. 3, 2020

(86) PCT No.: PCT/US2020/049150
§ 371 (c)(1),
(2) Date: Feb. 11, 2022

(87) PCT Pub. No.: WO2021/050346
PCT Pub. Date: Mar. 18, 2021

(65) Prior Publication Data
US 2022/0326997 A1 Oct. 13, 2022

Related U.S. Application Data

(60) Provisional application No. 62/900,213, filed on Sep. 13, 2019.

(51) Int. Cl.
*G06F 9/46* (2006.01)
*G06F 9/50* (2006.01)

(52) U.S. Cl.
CPC ............ *G06F 9/5011* (2013.01); *G06F 9/466* (2013.01); *G06F 9/5038* (2013.01)

(58) Field of Classification Search
CPC ....... G06F 9/5011; G06F 9/466; G06F 9/5038
See application file for complete search history.

(56) References Cited

U.S. PATENT DOCUMENTS 8,706,864 B1 * 4/2014 Brandwine ............. H04L 43/04
709/224
10,275,267 B1 * 4/2019 de Kadt ............... H04L 41/0803
(Continued)

OTHER PUBLICATIONS

International Application No. PCT/US2020/049150, "International Search Report and Written Opinion", dated Nov. 19, 2020, 14 pages.
(Continued)

*Primary Examiner* — Emerson C Puente
*Assistant Examiner* — Jonathan R Labud
(74) *Attorney, Agent, or Firm* — Kilpatrick Townsend & Stockton LLP

(57) ABSTRACT

Systems and methods for secure resource management are provided. A secure resource management system receives from a client computing system associated with a resource provider a query for classifying a resource user associated with the resource provider. The secure resource management system determining a set of resource abuser criteria for classifying the resource user as a resource abuser. The secure resource management system determines that the resource user is a resource abuser or a potential resource abuser based on the set of resource abuser criteria and a resource transaction history associated with the resource user. Based on determining that the resource user is a resource abuser or a potential resource abuser, the secure resource management system generates and transmits a response to the query to the client computing system. The response can be used to restrict or deny access to the resource by the resource user.

20 Claims, 4 Drawing Sheets

(56) References Cited

U.S. PATENT DOCUMENTS

| | | | |
|---|---|---|---|
| 2007/0169204 A1 | 7/2007 | Janakiraman et al. | |
| 2007/0203776 A1* | 8/2007 | Austin | G06Q 10/1053 |
| | | | 705/321 |
| 2012/0096153 A1 | 4/2012 | Weiser et al. | |
| 2016/0026552 A1* | 1/2016 | Holden | H04L 43/045 |
| | | | 709/224 |
| 2018/0150877 A1* | 5/2018 | Hod | H04L 67/025 |
| 2018/0183829 A1* | 6/2018 | Ward | H04L 67/01 |
| 2019/0377871 A1* | 12/2019 | Park | G06F 21/552 |

OTHER PUBLICATIONS

Canadian Application No. CA3,151,101, Office Action, Mailed On Jan. 16, 2024, 3 pages.

* cited by examiner

SECURE RESOURCE MANAGEMENT TO PREVENT RESOURCE ABUSE

CROSS-REFERENCE TO RELATED APPLICATIONS

This claims priority to U.S. Provisional Application No. 62/900,213, entitled "Secure Resource Management to Prevent Resource Abuse," filed on Sep. 13, 2019, which is hereby incorporated in its entirety by this reference.

TECHNICAL FIELD

This disclosure relates generally to increasing the security of resource management by controlling resource access to prevent abuse of resources by resource users.

BACKGROUND

Resource management, or more specifically resource access control, becomes more and more challenging as various resources now can be more conveniently acquired and accessed. For example, a user can acquire an online storage resource for a fixed term through online transactions with a resource provider of the online storage resource, and gain access to the online storage resource over the Internet. Similarly, for monetary resources, a consumer can obtain the resource or a token representing the resource through online transactions.

Resources are typically limited and are generally shared by multiple resource users. For example, an online storage resource typically has storage capacity and can support a limited number of resource users at the same time. If all the resources have been assigned to resource users, a new resource user would have to wait for the resource to be released by a current resource user before being granted access to the resource. However, there are resource users who occupy resources without releasing them even when the term of the use is over, reducing the resource provider's capability of serving other resource users.

Withholding the resource might be performed unintentionally by the resource users, such as an overlook of the due date of the fixed term. It might also be performed intentionally by malicious resource users trying to take advantage of the resource provider system or to attack the resource provider system to prevent the resource provider system from functioning normally. In either case, without detecting and identifying the resource users who are withholding resources, the security of the resource provider system might be compromised rendering the resource provider systems vulnerable to attacks.

SUMMARY

Various aspects of the present disclosure involve providing a centralized secure resource management system to prevent resource abuse and to control resource access. In one example, the secure resource management system receives, from a client computing system associated with a resource provider, a query for classifying a resource user associated with the resource provider. The secure resource management system determines a set of resource abuser criteria used for classifying the resource user as a resource abuser. The set of resource abuser criteria include occupying a resource for more than a continuous period of time without releasing the resource, and utilizing the resource more than a threshold percentage of an allowance of the resource. The allowance of the resource defines a maximum amount of the resource that the resource user is allowed to use. The secure resource management system further determines the resource user as a resource abuser or a potential resource abuser based on the set of resource abuser criteria and a resource transaction history associated with the resource user. Based on the determination, the secure resource management system generates and transmits a response to the client computing system. The response can be utilized to restrict or deny access to the resource by the resource user.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

BRIEF DESCRIPTION OF THE DRAWINGS

The foregoing, together with other features and examples, will become more apparent upon referring to the following specification, claims, and accompanying drawings.

DETAILED DESCRIPTION

Figure 1:
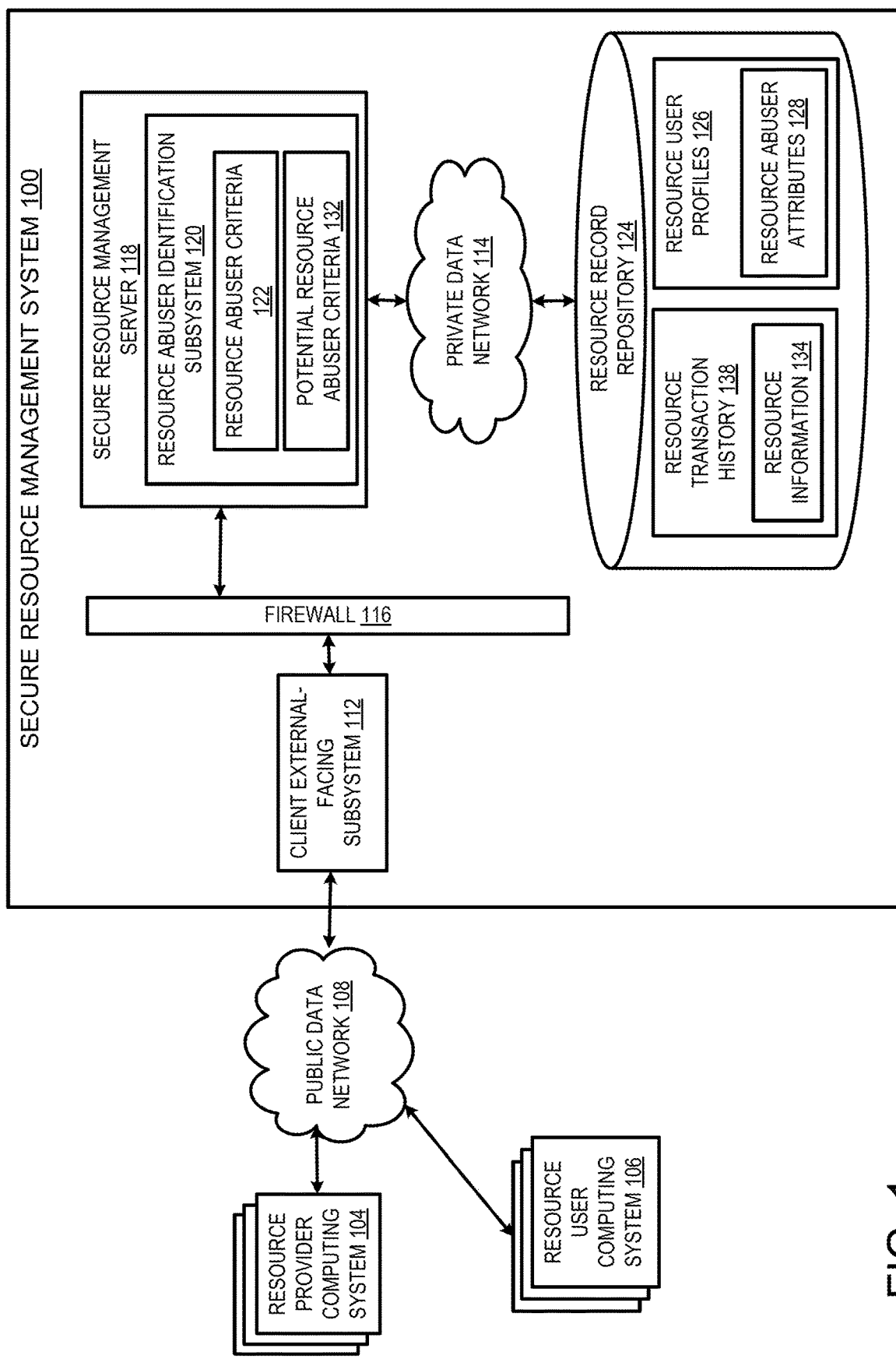
FIG. 1 is a block diagram depicting an example of a secure resource management system for determining resource abusers or potential resource abusers to prevent resource abuse, according to certain aspects of the present disclosure.

Certain aspects and features of the present disclosure involve providing a centralized secure resource management system to prevent resource abuse and to control resource access. In one example, in response to a query for classifying a resource user associated with a resource provider, the secure resource management system determines a set of resource abuser criteria for classifying a resource user as a resource abuser. The secure resource management system determines that the resource user is a resource abuser or a potential resource abuser based on the set of resource abuser criteria and a resource transaction history associated with the resource user. Using the determination, the secure resource management system can generate and transmit a response to the query to a computing system associated with the resource provider. The response can be used to restrict or deny access to the resource by the resource user.

For example, the secure resource management system can maintain a resource record repository configured for storing resource transaction histories associated with resource users. The resource transaction history describes transactions or operations involving resources provided by one or more resource providers, such as the operations of acquiring or releasing the resource, the date and time of the operations, the amount of resources involved in the operations. The resource record repository may also include a resource user profile for each resource user to maintain various information about the resource user.

If the secure resource management system receives a request to determine if a resource user is a resource abuser, the secure resource management system can access the resource record repository to obtain information about the resource user and past resource transactions involving the resource user. The secure resource management system further determines or accesses resource abuser criteria that define or classify a resource user as a resource abuser. In one example, the resource abuser criteria contain a set of rules where if each of the rules is satisfied for a resource user, the resource user can be identified as a resource abuser. For instance, the set of resource abuser criteria can include occupying a resource for more than a continuous period of time without releasing the resource, and utilizing the resource more than a threshold percentage of an allowance of the resource. Here, the allowance of the resource defines a maximum amount of the resource that the resource user is allowed to use.

The secure resource management system can determine whether the set of resource abuser criteria are satisfied for the resource user. For example, the secure resource management system can compute resource abuser attributes used in the set of resource abuser criteria by using the information about the resource user and past resource transactions involving the resource user. The secure resource management system further compares the computed resource abuser attributes with the thresholds involved in the set of resource abuser criteria. The comparison can be performed using exact values of the thresholds or through fuzzy matching.

If the resource abuser criteria are satisfied for the resource user, the secure resource management system determines that the resource user is a resource abuser. If the resource abuser criteria are not satisfied for the resource user, the secure resource management system can further examine a set of potential resource abuser criteria to determine whether the resource user can be classified as a potential resource abuser. The set of potential resource abuser criteria can be generated by relaxing one or more rules contained in the resource abuser criteria so that the rules are easier to be satisfied. If a resource user cannot be classified as a resource abuser or a potential resource abuser, the user is determined as a regular resource user.

In further examples, instead of presenting the resource abuser criteria as an explicit set of rules, the resource abuser criteria may be implemented as a machine learning model that is trained to use resource abuser attributes of a resource user as inputs and output the confidence value of the resource user being a resource abuser. The secure resource management system can further classify the resource user as a resource abuser, a potential resource abuser, or a regular resource user based on the confidence values.

Using the determination results, the secure resource management system can generate and transmit a response to the request identifying the resource user as a resource abuser, a potential resource abuser, or a regular resource user. Depending on the determination contained in the response, a resource provider may be configured to perform actions such as restricting or denying further access to the resource for those users who are identified as resource abusers or potential resource abusers.

As described herein, certain aspects provide improvements to resource management by detecting and identifying resource abusers thereby preventing abuse of resources and increasing the security of the resource provider system. The centralized secure resource management system in the present disclosure has access to the resource transaction history involving a resource user with one or more resource providers. This allows the centralized secure resource management system to comprehensively examine the resource user to determine or predict whether the resource user is or will be a resource abuser.

Thus, the centralized secure resource management system can provide a more accurate evaluation of resource users than individual resource providers. It further reduces the burden of implementing secure resource evaluation and access control mechanisms from individual resource providers. Additionally, or alternatively, because the secure centralized resource verification system can be implemented with highly complicated protection mechanisms, the security of the resource access control mechanism provided by the system can be more secure than the access control mechanism implemented by individual resource providers.

Operating Environment Example for Secure Resource Management System

FIG. 1 is a block diagram depicting an example of a secure resource management system 100 in which resource abusers or potential resource abusers are determined or predicted to prevent resource abuse, according to certain aspects of the present disclosure. As used herein, a resource user is an entity or an individual who has acquired or otherwise obtained resources from a resource provider for a term. A resource abuser is a resource user who is withholding (i.e. has not released) a resource after the term of the resource is over and has met a set of resource abuser criteria. A potential resource abuser is a resource user who has not met the set of resource abuser criteria, but has met the potential resource abuser criteria. The secure resource management system 100 is a specialized computing system that may be used for processing large amounts of data using a large number of computer processing cycles.

The secure resource management system 100 shown in FIG. 1 includes a secure resource management server 118 that is configured for identifying resource abusers among resource users to facilitate resource providers to control access to resources by resource users. The secure resource management system 100 further includes a resource record repository 124 configured for securely storing resource records describing resource transactions and resource users.

For example, the resource record repository 124 may include resource transaction history 138 describing transactions or operations involving resources provided by one or more resource providers, such as the transactions or operations of acquiring a resource by a resource user, the transactions or operations of releasing the resource by the resource user, the date and time of the transactions or operations, the amount of resources involved in each of the transactions or operations, and so on.

For the resource transactions, the resource transaction history 138 also includes resource information 134 that describes the resources involved in these transactions, such as the type of the resource, the identifier of the resource, the quantity of the resource, the term of the resource, the schedule for releasing the resource release, and so on. For instance, if the resource is an online storage resource, the resource information can indicate the resource being an online storage resource. The resource information for the online storage resource may further include information such as a serial number associated with the online storage resource, the capacity of the online storage resource, the term of the resource, i.e. the time period during which the storage resource can be used, the network address of the storage resource, the resource allowance (i.e. the maximum amount of the resource that the resource user is allowed to use), and so on. For a monetary resource, the resource information 134 may include the type or nature of the resource (e.g. a loan or a credit), the total amount of the resource allowance (e.g. the credit limit), the due date for the loan or credit card repayment, the account number of the loan or credit, the remaining balance of the loan or credit, and others.

The resource record repository 124 may also include a resource user profile 126 for each resource user. The resource user profile 126 contains various information about the resource user, such as the name, address, or identification. Other information, such as data related to the capability of the resource user to timely release the resource, may also be included. If the resource user is a company or an organization, such as a company accessing an online storage resource, the resource user profile 126 can include the name of the company, the network or physical address of the company, the identification (e.g. the taxpayer identification number (TIN)) of the company, the revenue of the company, the total amount of the resource held by the company, and so on. If the resource user is an individual, such as a credit card holder borrowing monetary resources from a bank or a financial institute, the resource user profile 126 may include the name, address, social security number (SSN) of the individual. The resource user profile 126 may also include the income of the individual indicating the capability of the individual to timely release or repay the monetary resource to the bank or financial institute. In some examples, the resource user profile 126 of a resource user is utilized to identify and retrieve the resource transaction history 138 associated with the resource user.

In some examples, the resource record repository 124 is implemented using a secure database by implementing secure mechanisms such as data encryption, access control, integrity control, data backup, or any combination thereof. The resource record repository 124 may also be implemented through other types of storage mechanisms, such as a blockchain.

Based on the resource record repository 124, the secure resource management server 118 can utilize a resource abuser identification subsystem 120 to identify resource abusers or potential resource abusers. For example, the resource abuser identification subsystem 120 can be configured to receive a request to determine if a resource user is a resource abuser or to identify resource abusers from a group of resource users. In response to such a request, the resource abuser identification subsystem 120 communicates with the resource record repository 124 to access the resource user profile 126 of a resource user and to query the resource transaction history 138 to retrieve past resource transactions involving the resource user.

The resource abuser identification subsystem 120 further determines or accesses resource abuser criteria 122 that define or classify a resource user as a resource abuser. In one example, the resource abuser criteria 122 contains a set of rules where if each of the rules is satisfied for a resource user, the resource user can be identified as a resource abuser. In one example, the set of rules can involve comparing one or more resource abuser attributes 128 with their respective threshold values. For instance, the resource abuser criteria 122 may include two rules: a withholding length (i.e. the duration of the time when the resource user continuously occupying a past-due resource without releasing any portion of the resource) is higher than a threshold withholding length and a withholding ratio (i.e. the ratio of the resource being occupied over the resource allowance) is higher than a withholding ratio. For this set of resource abuser criteria 122, the resource abuser attributes 128 include the withholding length and the withholding ratio. The resource abuser identification subsystem 120 can compute these resource abuser attributes 128 based on the resource transaction history 138 and the resource user profile 126 of the resource user. The resource abuser identification subsystem 120 may further store the resource abuser attributes 128 in the resource record repository 124 along with the resource user profile 126. In some examples, the resource abuser identification subsystem 120 is further configured to periodically update the resource abuser attributes 128 based on new information added to the resource transaction history 138.

As discussed above, determining whether a rule in the resource abuser criteria 122 is satisfied can be performed by comparing the associated resource abuser attributes 128 with the exact values of corresponding thresholds. Alternatively, or additionally, the determination can be performed using non-exact values of the resource abuser attributes 128 or the thresholds, such as through fuzzy matching.

If the resource abuser criteria 122 are not satisfied for the resource user, the resource abuser identification subsystem 120 can further examine a set of potential resource abuser criteria 132 to determine whether the resource user can be classified as a potential resource abuser. The set of potential resource abuser criteria 132 can be generated by relaxing one or more rules contained in the resource abuser criteria 122 so that the rules are easier to be satisfied. For example, if a rule in the resource abuser criteria 122 specifies that the withholding length of the resource is higher than 120 days, the corresponding criteria in the potential resource abuser criteria 132 can include a rule requiring the withholding length to be higher than 60 days. Similarly, if a rule in the resource abuser criteria 122 includes a rule specifying that the withholding ratio of the resource is higher than 80%, the corresponding rule in the potential resource abuser criteria 132 can require the withholding ratio of the resource is higher than 50%. If the resource user satisfies the potential resource abuser criteria 132, the resource user can be classified as a potential resource abuser. Other rules or criteria can also be utilized to determine the potential resource abuser. If a resource user cannot be classified as a resource abuser or a potential resource abuser, the user is determined as a regular resource user.

In further examples, instead of presenting the resource abuser criteria 122 as an explicit set of rules, the resource abuser criteria 122 may be implemented as a machine learning model that is trained to use resource abuser attributes 128 of a resource user as inputs and output the confidence value of the resource user being a resource abuser. The resource abuser identification subsystem 120 can further classify the resource user as a resource abuser, a potential resource abuser or a regular resource user based on the confidence values. For example, the resource abuser identification subsystem 120 can compare the confidence value with a first threshold to determine the resource user as a resource abuser if the confidence value is higher than the first threshold. The resource abuser identification subsystem 120 then compares the confidence value with a second threshold that is lower than the first threshold to determine the resource user as a potential resource abuser if the confidence value for the resource user is lower than the first threshold but higher than the second threshold. If the confidence value is lower than the second threshold, the resource user can be classified as a regular resource user. Additional details about identifying or predicting a resource abuser are provided below with regard to FIGS. 2-3.

The secure resource management system 100 also includes a client external-facing subsystem 112 including one or more computing devices to provide a physical or logical subnetwork (sometimes referred to as a "demilitarized zone" or a "perimeter network"). The client external-facing subsystem 112 is configured to expose certain online functions of the secure resource management system 100 to an untrusted network, such as the Internet or another public data network 108. In some aspects, the client external-facing subsystem 112 can be implemented as edge nodes, which provide an interface between the public data network 108 and a cluster computing system, such as a Hadoop cluster used by the secure resource management system 100.

The client external-facing subsystem 112 is communicatively coupled, via a firewall device 116, to one or more computing devices forming a private data network 114. The firewall device 116, which can include one or more devices, creates a secured part of the secure resource management system 100 that includes various devices in communication via the private data network 114. In some aspects, by using the private data network 114, the secure resource management system 100 can house the resource record repository 124 in an isolated network (i.e., the private data network 114) that has no direct accessibility via the Internet or another public data network 108.

Various computing systems may interact with the secure resource management system 100 through the client external-facing subsystem 112, such as one or more resource provider computing systems 104. A resource provider computing system 104 can include one or more devices, such as individual servers or groups of servers operating in a distributed manner. A resource provider computing system 104 can include any computing device or group of computing devices operated by a seller, lender, or another provider of products or services. The resource provider computing system 104 can include one or more server devices that include or otherwise access one or more non-transitory computer-readable media. The resource provider computing system 104 can also execute an online service. The online service can include executable instructions stored in one or more non-transitory computer-readable media. The resource provider computing system 104 can be configured to perform operations such as managing resources, managing resource users, granting, restricting, or denying resource users' access to the resources, and so on.

For instance, the user or other entity accessing the resource provider computing system 104 can use the resource provider computing system 104 to engage in an electronic transaction with a resource user computing system 106 via an online service. An electronic transaction between the resource provider computing system 104 and the resource user computing system 106 can include, for example, acquiring resources (e.g. obtaining online storage or computing resources, or obtaining credit), or releasing resources (e.g. releasing online storage or computing resources or repaying balance). For example, the electronic transaction can include the resource user computing system 106 sending an online request through the resource provider computing system 104 for a credit card or for increasing the credit limit of a credit card. An electronic transaction can also include the resource user computing system 106 repaying the balance on the credit card through an online service, such as a resource distribution platform implemented by a third-party system or by the resource provider computing system 104. For example, the electronic transaction can include the resource user paying the balance of the credit card to the resource provider through an online banking service.

The resource provider computing system 104 maintains a record for each of the transactions including the information about the resource users involved in the transactions. The resource provider computing system 104 periodically, or upon request, or at the time of requesting identification of resource abusers, sends the recorded transaction data to the secure resource management system 100 so that the secure resource management server 118 can update the resource record repository 124 based on the transaction data. The update may include an update to the resource transaction history 138 to include the resource transactions and an update to the resource information 134 to update the amount of the resource being acquired or released.

The resource user computing system 106 may include any computing device or other communication device operated by an individual, such as a consumer, or an entity, such as a company, an institute, an organization, or other types of entities. The resource user computing system 106 can include executable instructions stored in one or more non-transitory computer-readable media. The resource user computing system 106 may interact with the resource provider computing system 104 via one or more public data networks 108 to facilitate electronic transactions. For instance, a resource user can use a resource user computing system 106, such as a laptop or other end-user device, to access an online service hosted by the resource provider computing system 104 to perform various transactions as discussed above.

In some examples, a resource provider computing system 104 may submit a request to the secure resource management system 100 to identify one or more resource abusers from the resource users that interacted with the resource provider computing system 104. For example, the resource provider computing system 104 may submit a request to determine whether a resource user is a resource abuser. The request may be submitted by the resource provider computing system 104 after receiving a request from the resource user computing system 106 to acquire a resource or before offering more resources to the resource user. The resource provider computing system 104 may also submit such a request periodically, such as weekly, monthly, or quarterly to identify resource abusers from multiple resource users.

The secure resource management system 100 can process such a request using the resource abuser identification subsystem 120 as discussed above and return the results of the analysis to the resource provider computing system 104. The resource abuser identification subsystem 120 can return warning messages to the resource provider computing system 104 listing the users who have been identified as resource abusers or potential resource abusers. The resource abuser identification subsystem 120 can also return a score for each resource user or potential resource abuser indicating the likelihood of the user becoming a resource abuser within a future time span. Additionally, the resource abuser identification subsystem 120 can also provide a list of resource users who have at least one resource abuser attribute 128 exceeds or is close to the corresponding threshold set in the resource abuser criteria 122. Other results can also be generated and returned to the resource provider computing system 104.

Depending on the results, the resource provider computing system 104 may be configured to perform different actions. For example, the resource provider computing system 104 can deny further access to the resource for those users who are identified as resource abusers. The resource provider computing system 104 can also restrict or deny further access to the resource for those users who are identified as potential resource abusers. Restricting the access to the resource can be implemented by reducing the resource allowance of the potential resource abusers, stopping advertising further resources to the potential resource abusers, limiting the daily or weekly amount of resources accessed by the potential resource abusers, and so on. Different levels of restrictions can be applied to the potential resource abusers based on their associated risk or intensity. Other ways of restricting further access to the resource can be employed. Additional details regarding determining or predicting resource abusers by the secure resource management system 100 are provided below with regard to FIGS. 2-3.

Figure 2:
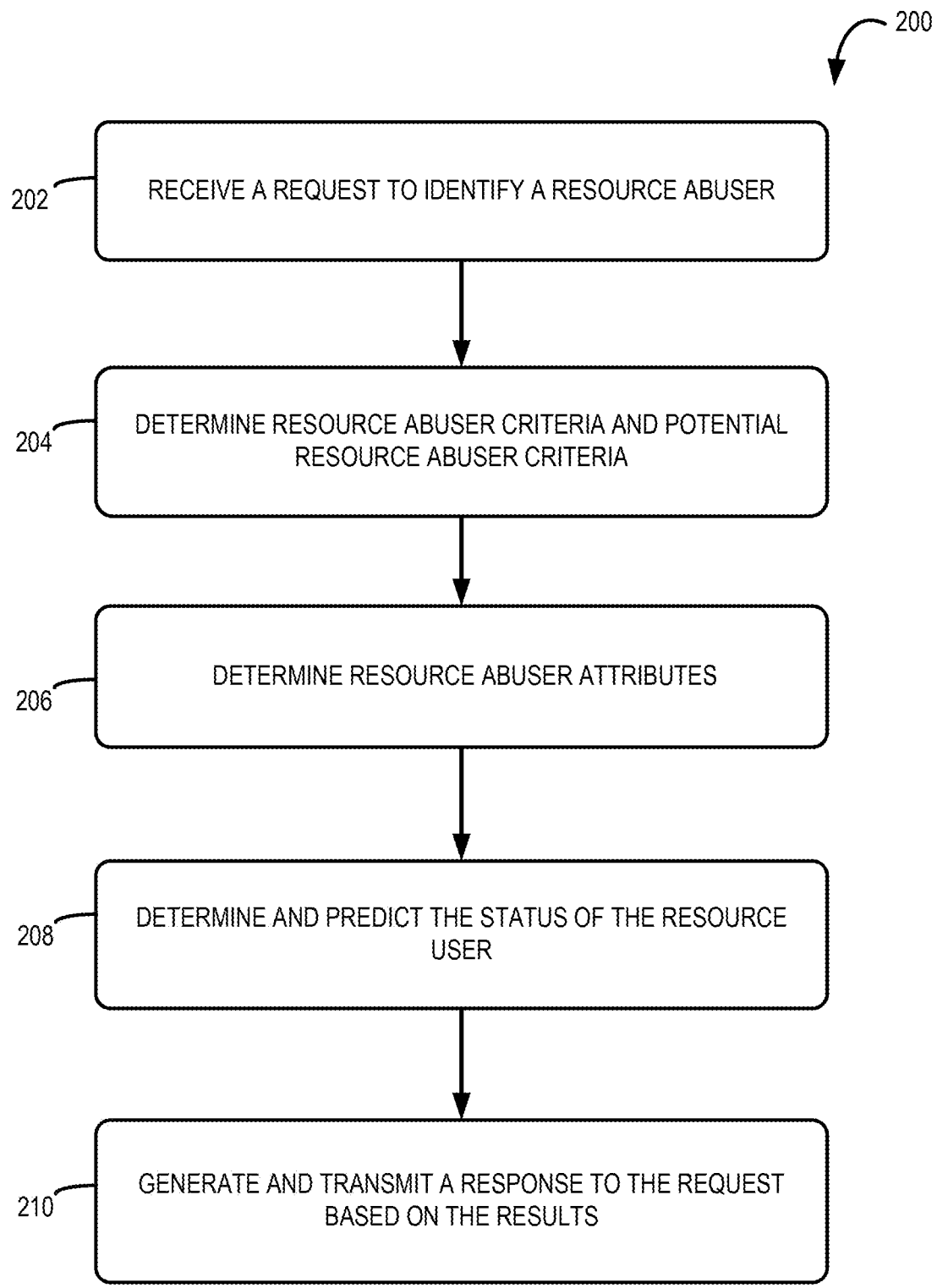
FIG. 2 is a flow chart illustrating an example of a process for managing resource transactions to prevent resource abuses according to certain aspects of the present disclosure.

FIG. 2 is a flow chart illustrating an example of a process 200 for managing resource transactions to prevent resource abuses according to certain aspects of the present disclosure. For illustrative purposes, the process 200 is described with reference to implementations described above with respect to one or more examples described herein. Other implementations, however, are possible. In some aspects, the steps in FIG. 2 may be implemented in program code that is executed by one or more computing devices such as the secure resource management server 118 depicted in FIG. 1. In some aspects of the present disclosure, one or more operations shown in FIG. 2 may be omitted or performed in a different order. Similarly, additional operations not shown in FIG. 2 may be performed.

At block 202, the process 200 involves receiving a request to identify a resource abuser. As discussed above with respect to FIG. 1, the request may be a request to determine if a specific resource user is a resource abuser or a potential resource abuser. The request may also be a request to identify resource abusers or potential resource abusers from a group of resource users. Further, the request may be sent by the resource provider computing system 104 after a resource user requests for resources, before allowing a specific resource user to access more resources, or at other times.

At block 204, the process 200 involves determining resource abuser criteria 122. In some examples, the resource abuser criteria 122 is implemented as a set of rules so that the resource abuser attributes 128 or other aspects of the resource users can be compared with the set of rules to determine if the resource abuser criteria 122 are satisfied. For example, the resource abuser criteria 122 can include the following rules:

Rule 1. The resource user has a withholding length of 120 days or more;
Rule 2. The resource user has a withholding ratio of 80% or more;
Rule 3. Both rules 1 and 2 are observed in two or more accounts of the resource user in the past four years;
Rule 4. The resource user is a normal resource user at the beginning and suddenly have the behavior listed in Rules 1-3.

For example, a resource user for the monetary resource is identified as a resource abuser if the resource user meets the following: a) has at least two accounts in the past four years, wherein b) each of these accounts has an unpaid balance for over 80% of the corresponding credit limit, c) no payment has been made to the balance for each of these accounts for at least 120 days, and d) these accounts are in good standing (i.e. full balance or minimum balance are paid) for a while in the past, such as 1-3 years, before a) to c) occurred. Additional rules may be included in the resource abuser criteria 122 to limit the analysis for certain types of resources. For example, the resource abuser criteria 122 for monetary resources can include an additional rule e) that limits the analysis for non-mortgage trades of the resource users.

Note that the example resource abuser criteria 122 described above is for illustration only, and should not be construed as limiting. Other threshold values can be utilized in the resource abuser criteria 122. For example, the threshold withholding length in Rule 1 can be set to any value, such as 90 days, 100 days, 150 days. In one example, the threshold withholding length is set to any value equal to or above 90 days. Similarly, the threshold for withholding ratio can also be set to a value different from 80%, such as 50%, 70%, 90%, and so on. The threshold number of accounts in Rule 3 can also be adjusted to be one or any other value greater than one. The time window of the resource transaction history used for analysis can be any number of past time units, such as day, month, or year. The time duration when the user is a normal resource user at the beginning can also be set to any number that is reasonable for the type of resource and the term of the resource, such as one year, two years, seven years, etc.

In addition, the rules contained in the resource abuser criteria 122 are also not limited to the four rules described in the above example. Fewer or more rules can be included in the resource abuser criteria 122. For example, the resource abuser criteria 122 can also include a rule associated with the repeated behavior of the resource user. For example, for monetary resources, the rule can be related to a cyclic behavior of the resource user where the resource user opens a number of new accounts when his credit score is good, stops paying balances on some of those accounts which reduces his credit score, waits for some time until his score improves, again opens a new account and stops paying on some accounts. For monetary resources, the resource abuser criteria 122 can also include rules such as changing the address of an account to the address of a third party, such as a Debit Servicing Agency (DSA) address or a law firm address, having a threshold number of disputed accounts, having repeated resource abuser behavior, checking credit score with a frequency higher than a threshold, and so on. Rules involving other aspects of the resource users can also be included, such as the number of open accounts, the credit score range, the geographical location, the dispute status, the account open date, risk scores, or synthetic identity scores. These rules can be used to replace or as additions to the rules listed in the above example.

In some examples, the various parameters or thresholds in the resource abuser criteria 122 are determined by the resource abuser identification subsystem 120 in order to meet a target value, such as a target unit resource abuse rate. A unit resource abuse rate can be defined as the amount of resource that is abused per unit resource, such as 1%, 5%, or 20%. For monetary resources, a unit resource abuse rate of 5% indicates that for every 100 dollars, 5 dollars are lost, i.e. not paid back by users. The target unit resource abuse rate can be set for the entire group of users or each category of users, including the resource abuser category, the potential resource abuser category, and the normal resource user category. The resource abuser identification subsystem 120 can select the parameters and thresholds in the resource abuser criteria 122, such as the withholding length threshold, the withholding ratio threshold, the threshold number of accounts, and others, so that the target unit resource abuse rate(s) are met.

Other types of targets can also be utilized by the resource abuser identification subsystem 120 to determine the parameters or thresholds of the resource abuser criteria 122. For example, the resource abuser identification subsystem 120 can set the target to be the bad account default rate, i.e. the number of accounts that are in default (payment past due for 90 days) over the total number of accounts. The bad account default rate can be set for all the resource users or set separately for the resource users in each category. Similarly, the target can be set based on the desired percentage of credit outcomes, such as balance paid as agreed, converting to a fixed-rate loan, sent to the internal recovery team, sent to external collections, charged off and closed, etc. Determining the resource abuser criteria 122 to meet the target as discussed above can be performed using any numerical optimization techniques, machine learning techniques, or statistics techniques known in the art.

The resource abuser identification subsystem 120 further determines the potential resource abuser criteria 132 that can be used to identify potential resource users. The potential resource abuser criteria 132 can be obtained by adjusting one or more parameters or thresholds in the resource abuser criteria 122 so that they are easier to be satisfied. For example, the potential resource abuser criteria 132 corresponding to the resource abuser criteria 122 shown in the above example can be generated by adjusting one or more thresholds in the resource abuser criteria 122, such as Rule 1'. The resource user has a withholding length of 60 days or more;
Rule 2'. The resource user has a withholding ratio of 50% or more;
Rule 3'. Both rules 1 and 2 are observed in at least one account of the resource user;
Rule 4. The resource user is a normal resource user at the beginning and suddenly have the behavior listed in Rules 1-3.

In this example, Rule 4 of the potential resource abuser criteria 132 remains the same as the resource abuser criteria 122. Rules 1-3 in the resource abuser criteria 122 are relaxed in the potential resource abuser criteria 132 to identify those resource users who have not met the resource abuser criteria 122, but are close to those criteria as the potential resource abusers.

The potential resource abuser criteria 132 can also have more rules or fewer rules than the resource abuser criteria 122. For instance, the potential resource abuser criteria 132 can include:

Rule 1'. The resource user has a withholding length of 60 days or more; AND
Rule 2'. The resource user has a withholding ratio of 80% or more; AND
Rule 3'. Both rules 1 and 2 are observed in at least one account of the resource user.
OR
Rule 5. The user has changed the address to the address of a third party.

In this example, the potential resource abuser criteria 132 does not include Rule 4 of the resource abuser criteria 122, but added Rule 5 as an alternative rule to Rules 1-3 to determine whether a resource user is a potential resource abuser. Other ways of determining the potential resource abuser criteria 132 can also be utilized and any of the factors or rules discussed above for determining the resource abuser criteria 122 can also be included in the potential resource abuser criteria 132.

Further, although the examples shown above use exact threshold values for the resource abuser attributes 128 in the resource abuser criteria 122 and the potential resource abuser criteria 132, such as 120 days of withholding the resource, 80% of the allowance being withheld, one or more thresholds can be represented as a fuzzy set instead of an exact number. For example, instead of setting the threshold for the withholding length to be exactly 120 days, the threshold can be a fuzzy set with a range between 100 and 120. As a result, an account with more than 100 days of withholding length is considered as meeting this criterion.

At block 206, the process 200 involves determining resource abuser attributes 128. The resource abuser identification subsystem 120 communicates with the resource record repository 124 to access the resource user profile 126 and the resource transaction history 138 to determine the resource abuser attributes 128. The resource abuser attributes 128 to be determined depend on the resource abuser criteria 122 and the potential resource abuser criteria 132. If a rule in the resource abuser criteria 122 or the potential resource abuser criteria 132 involves comparing a resource abuser attribute 128, such as the withholding length or the withholding ratio, with a threshold value, the resource abuser identification subsystem 120 determines the current value of the resource abuser attribute 128 based on the resource user profile 126 and the resource transaction history 138. In some examples, the resource abuser attributes 128 are determined for each of the accounts of the resource user currently being evaluated.

In some implementations, the resource abuser identification subsystem 120 saves the determined resource abuser attributes 128 for the resource user in the resource record repository 124 so that the resource abuser attributes 128 can be updated next time, instead of being re-computed, thereby reducing the computational complexity of the process. For example, the withholding length in the resource abuser attributes 128 can be updated by examining the resource release transactions of the resource user since the last time this attribute is calculated. If no resource is released since then, the withholding length can be updated by adding the time duration that has passed since the last calculation. In this way, the resource abuser identification subsystem 120 does not need to examine the transaction history that has been analyzed before. Other resource abuser attributes 128 may be updated in a similar way.

At block 208, the process 200 involves determining the status of the resource user by comparing the resource abuser attributes 128 with the resource abuser criteria 122 and the potential resource abuser criteria 132. If the resource abuser criteria 122 and the potential resource abuser criteria 132 specify exact threshold values for various parameters, the resource abuser identification subsystem 120 compares the resource abuser attributes 128 with the thresholds in the resource abuser criteria 122 and potential resource abuser criteria 132 to determine the status of the resource users. In other examples, the comparison between the resource abuser attributes 128 and the thresholds are performed through fuzzy matching. For example, one or more of the thresholds are represented using a fuzzy set that includes a range of values instead of an exact threshold value. The comparison of the resource abuser attributes 128 with the thresholds are thus performed by comparing the resource abuser attributes 128 with the range of values.

Based on the comparisons, if the resource abuser identification subsystem 120 determines that the resource abuser attributes 128 of a resource user meet the resource abuser criteria 122, the resource user is identified as a resource abuser. If the resource abuser identification subsystem 120 determines that the resource abuser attributes 128 of a resource user do not meet the resource abuser criteria 122, the resource abuser identification subsystem 120 compares the resource abuser attributes 128 with the potential resource abuser criteria 132. If the potential resource abuser criteria 132 are met, the resource user is identified as a potential resource abuser. Otherwise, the resource user is identified as a regular resource user.

While in the above examples, the resource abuser criteria 122 and potential resource abuser criteria 132 are described as rules that comparing various resource abuser attributes 128 with thresholds or threshold ranges, the resource abuser criteria 122 and the potential resource abuser criteria 132 can also be implemented in other ways. For example, a machine learning model can be trained to use the resource abuser attributes 128 as inputs and to output a confidence value of the resource user being a resource abuser. Based on the confidence values, the resource abuser identification subsystem 120 can classify a resource user as a resource abuser, a potential resource abuser, or a regular resource user.

For example, the resource abuser identification subsystem 120 can select two thresholds with one threshold being higher than the other. The resource abuser identification subsystem 120 compares the confidence value with the higher threshold to determine the resource user as a resource abuser if the confidence value exceeds the higher threshold. If the confidence value does not exceed the higher threshold, the resource abuser identification subsystem 120 compares the confidence value with the lower threshold. If the confidence value for the resource user exceeds the lower threshold, the resource user is determined as a potential resource abuser; otherwise, the resource user is classified as a regular resource user.

The examples described above are used for descriptive purposes in that the determination of the status of a resource user is to identify and characterize a resource user or a group of resource users based on observable attributes of the resource users. In some examples, the resource abuser identification subsystem 120 is further configured to predict the future behavior of resource users, such as the potential resource abusers and the regular resource user. For example, the resource abuser identification subsystem 120 can be configured to determine a score for each of the non-resource abusers to predict the likelihood that the resource user will become a resource abuser in the future. The prediction can also be made for the likelihood of individual events, such as the withholding length reaching 30, 60, 90, or 120 days, the likelihood of the account staying in current, closed, or collection status, the likelihood of a specific percentage (e.g. 10%, 20%) of the resource will be at risk, and so on.

The prediction can be made for an event occurring in the next N days or months. Additionally, or alternatively, the prediction can be made for an event occurring in exactly N days or months. For instance, the resource abuser identification subsystem 120 can calculate the likelihood that a resource user will become a resource abuser in the next N months. The resource abuser identification subsystem 120 can also calculate the likelihood that a resource user will become a resource abuser exactly in N months. N can be 3, 6, 12, 18, 24 or any other values.

Further, for the classification or the prediction, the resource abuser identification subsystem 120 can be configured to rank the results based on the intensity of the results, such as the severity of the events being predicted or the status of the resource users. In these examples, a resource user identified as a resource abuser has a higher intensity than a resource user identified as a potential resource abuser. As such, the resource abuser identification subsystem 120 can rank the resource abusers before the potential resource abusers. Similarly, an event that the withholding length of a resource user will reach 120 days has a higher intensity than the event that the withholding length of a resource user will reach 30 days. As such the prediction of the 120 days of withholding length is ranked before the prediction of the 30 days of withholding length. Other predictions and classifications can be ranked similarly. By ranking the results in this way, the resource providers can focus on the high-intensity classifications or predictions first so that the risks associated with the resource distribution system can be reduced within a shorter time period.

At block 210, the process 200 involves generating and transmitting a response to the request based on the results of the analysis performed above. For example, the response can include a list of resource users that have been identified as resource abusers. Additional details regarding these resource abusers can be included in the list, such as the number of accounts that meet one or more rules in the resource abuser criteria 122. Examples include the number of accounts with more than 80% withholding ratio, the number of accounts having withholding length higher than 120 days, whether there is an address change, e.g. to DSA address, the number of accounts repeatedly showing the resource abuser behavior, the amount of resource lost due to the repeating behavior, and so on.

The response can further include a notification to the resource provider that a resource user is a potential resource abuser and how close the resource user is to become a resource abuser. For example, the notification can indicate that a potential resource abuser will become a resource abuser if he keeps withholding the resource for another 90 days. The notification can also indicate if the potential resource user has switched his address to a third party address in other accounts. Other notifications can also be generated based on the resource abuser criteria 122 and the potential resource abuser criteria 132. Additional details of the resource user and the resource abuser attributes 128 may also be included in the notification.

If the resource abuser identification subsystem 120 has generated predictions for the potential resource abusers and regular resource users, the predicted likelihood or scores can also be provided to the resource provider, such as the likelihood that a resource user will become a resource abuser in the next N months or exactly in N months. As discussed above, the lists, notifications, or scores may also be ranked in terms of their intensity when being transmitted to the resource provider.

Based on the results contained in the response, the resource provider computing system 104 can perform operations to improve the security of the resource provider system. For example, the resource provider computing system 104 can restrict or deny further access to the resource for those users who are identified as resource abusers. The resource provider computing system 104 can also restrict or deny further access to the resource for those users who are identified as potential resource abusers. Restricting the access to the resource can be implemented by reducing the resource allowance of the potential resource abusers, stopping advertising further resources to the potential resource abusers, limiting the daily or weekly amount of resources accessed by the potential resource abusers, and so on. Different levels of restrictions can be applied to the potential resource abusers based on their associated risk or intensity. For those users who are classified as regular resource users but having a high likelihood of becoming a resource abuser in the future, the resource abuser identification subsystem 120 may also restrict their access to the resource by reducing or stopping advertising further resources to these users.

Figure 3:
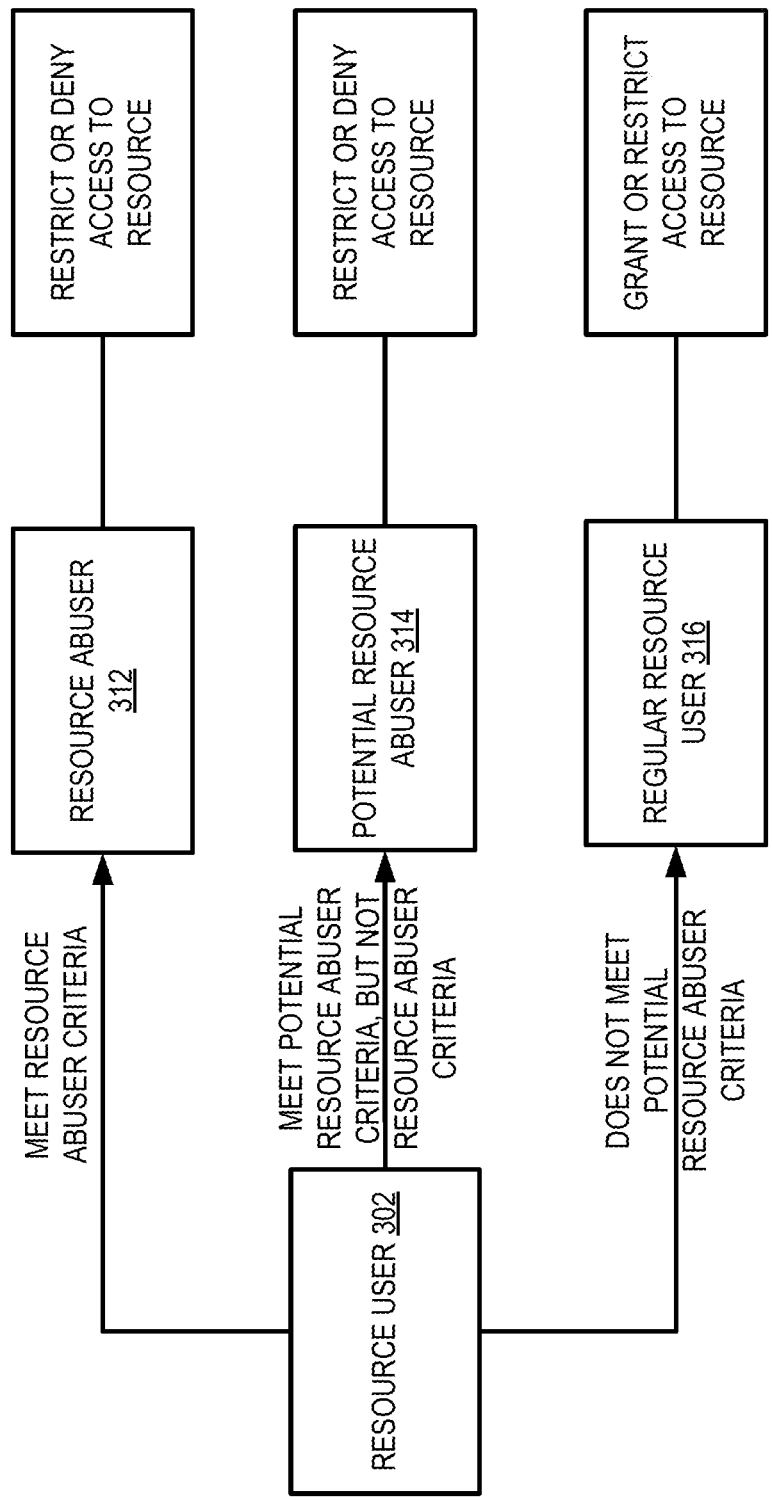
FIG. 3 is a diagram summarizing the classification of the resource users and their associated access permissions, according to certain aspects of the present disclosure.

FIG. 3 summarizes the classification of the resource users and their associated access permissions. As shown in FIG. 3, a resource user 302 is classified as a resource abuser 312 if the associated resource abuser attributes 128 meet the resource abuser criteria 122. If the resource abuser attributes 128 of the resource user 302 do not meet the resource abuser criteria 122, but meet the potential resource abuser criteria 132, the resource user 302 is classified as a potential resource abuser 314. If the resource abuser attributes 128 of the resource user do not meet the potential resource abuser criteria 132, the resource user 302 is classified as a regular resource user 316.

Based on the classification, the resource provider computing system 104 may restrict or deny the resource abuser 312 and the potential resource abuser 314 further access to the resource as discussed above in detail with regard to FIGS. 1 and 2. The resource provider computing system 104 may grant the regular resource user 316 access to the resource as normal. If certain regular resource users are associated with a high likelihood of becoming a resource abuser in the future, the resource provider computing system 104 may also restrict those users' access to the resource.

Although the above description focuses on three categories of resource users: resource abusers, potential resource abusers, and regular resource users, any number of categories can be utilized for classification. For example, the resource abuser identification subsystem 120 can classify resource users into five categories: high-intensity resource abusers, resource abusers, potential resource abusers, high-risk regular resource users, and regular resource users. The resource abuser identification subsystem 120 further determines the corresponding criteria for each of the categories, and the resource abuser attributes 128 of a resource user is compared with these criteria to determine the proper category that the user should be classified into. Likewise, two categories, such as resource abusers and regular resource users, can also be used to classify resource users, and the criteria can be determined accordingly.

Example of Computing Environment for Secure Resource Management

Figure 4:
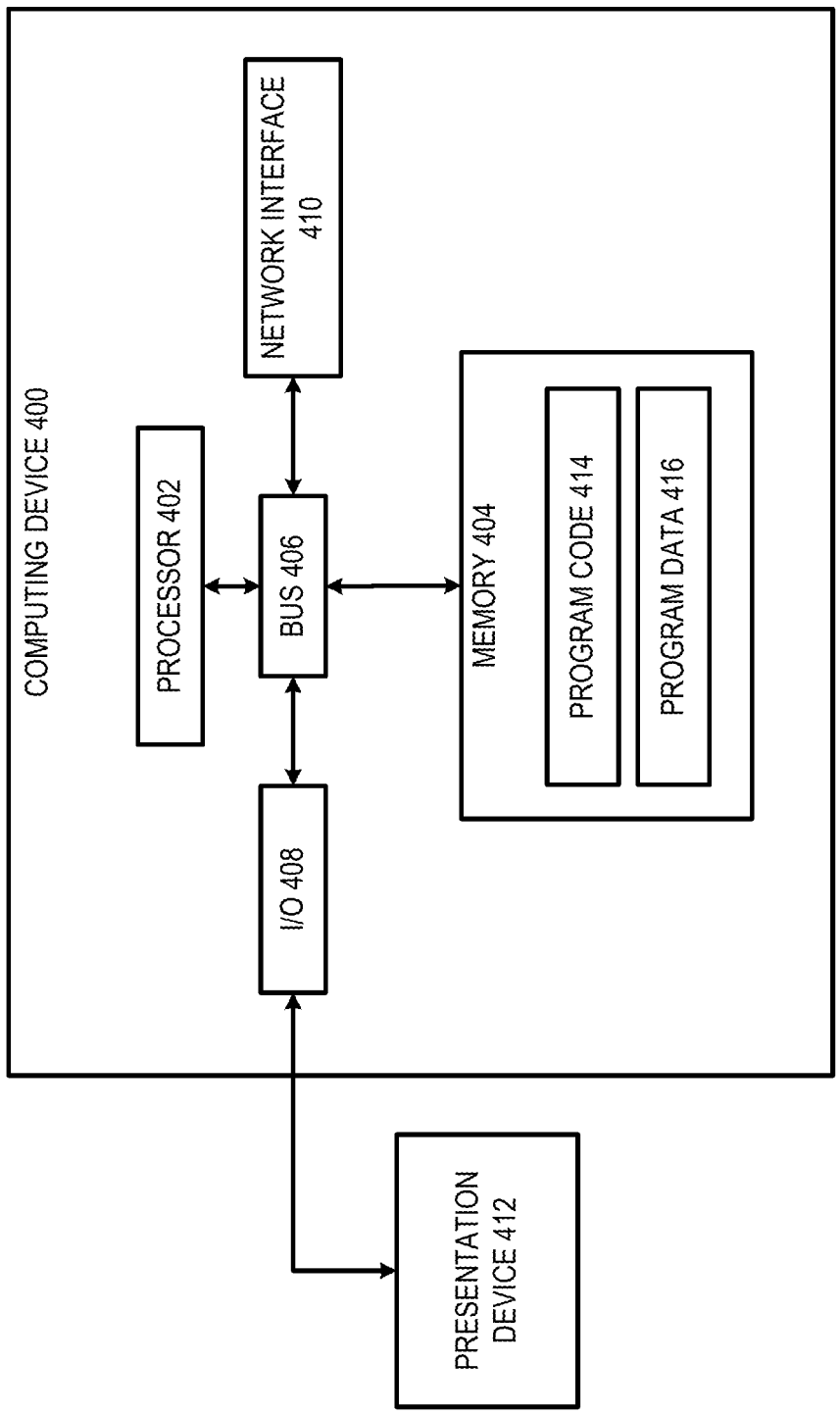
FIG. 4 is a block diagram depicting an example of a computing system suitable for implementing aspects of the techniques and technologies presented herein.

Any suitable computing system or group of computing systems can be used to perform the operations for the machine-learning operations described herein. For example, FIG. 4 is a block diagram depicting an example of a computing device 400, which can be used to implement the secure resource management server 118, the resource provider computing system 104, or the resource user computing system 106. The computing device 400 can include various devices for communicating with other devices in the secure resource management system 100, as described with respect to FIG. 1. The computing device 400 can include various devices for performing one or more secure resource management operations described above with respect to FIGS. 1-3.

The computing device 400 can include a processor 402 that is communicatively coupled to a memory 404. The processor 402 executes computer-executable program code stored in the memory 404, accesses information stored in the memory 404, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 402 include a microprocessor, an application-specific integrated circuit, a field-programmable gate array, or any other suitable processing device. The processor 402 can include any number of processing devices, including one. The processor 402 can include or communicate with a memory 404. The memory 404 stores program code that, when executed by the processor 402, causes the processor to perform the operations described in this disclosure.

The memory 404 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C #, Visual Basic, Java, Scala, Python, Perl, JavaScript, ActionScript, etc.

The computing device 400 may also include a number of external or internal devices such as input or output devices. For example, the computing device 400 is shown with an input/output interface 408 that can receive input from input devices or provide output to output devices. A bus 406 can also be included in the computing device 400. The bus 406 can communicatively couple one or more components of the computing device 400.

The computing device 400 can execute program code 414 such as the resource abuser identification subsystem 120. The program code 414 may be resident in any suitable computer-readable medium and may be executed on any suitable processing device. For example, as depicted in FIG. 4, the program code 414 can reside in the memory 404 at the computing device 400 along with the program data 416 associated with the program code 414, such as the reporting message, the resource value prediction model, or the predicted value. Executing the program code 414 can configure the processor 402 to perform the operations described herein.

In some aspects, the computing device 400 can include one or more output devices. One example of an output device is the network interface device 410 depicted in FIG. 4. A network interface device 410 can include any device or group of devices suitable for establishing a wired or wireless data connection to one or more data networks described herein. Non-limiting examples of the network interface device 410 include an Ethernet network adapter, a modem, etc.

Another example of an output device is the presentation device 412 depicted in FIG. 4. A presentation device 412 can include any device or group of devices suitable for providing visual, auditory, or other suitable sensory output. Non-limiting examples of the presentation device 412 include a touchscreen, a monitor, a speaker, a separate mobile computing device, etc. In some aspects, the presentation device 412 can include a remote client-computing device that communicates with the computing device 400 using one or more data networks described herein. In other aspects, the presentation device 412 can be omitted.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other types of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as an open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A method that includes one or more processing devices performing operations comprising:
receiving, by a secure resource management system and from a client computing system associated with a resource provider, a query for classifying a resource user associated with the resource provider;
determining, by the secure resource management system, a set of resource abuser criteria for classifying the resource user as a resource abuser, the set of resource abuser criteria comprising occupying a resource for more than a continuous period of time without releasing the resource and utilizing the resource more than a threshold percentage of an allowance of the resource, the allowance of the resource defining a maximum amount of the resource that the resource user is allowed to use;
determining, by the secure resource management system, that the resource user is not a resource abuser based on the set of resource abuser criteria;
responsive to the determination that the resource user is not a resource abuser, determining, by the secure resource management system, a set of potential resource abuser criteria for classifying the resource user as a potential resource abuser, wherein the set of potential resource abuser criteria is generated by adjusting a threshold of at least one of the set of resource abuser criteria such that the threshold of the at least one of the set of potential resource abuser criteria is lower than a corresponding threshold of one of the set of resource abuser criteria;
determining, by the secure resource management system, that the resource user is a potential resource abuser based on the set of potential resource abuser criteria and a resource transaction history associated with the resource user;
generating, by the secure resource management system and responsive to the query, a response based on determining that the resource user is a potential resource abuser; and
transmitting, by the secure resource management system, the response to the client computing system, wherein the response is usable to cause access to the resource by the resource user to be restricted or denied.

2. The method of claim 1, wherein determining that the resource user is a potential resource abuser comprises determining that the set of potential resource abuser criteria are satisfied based on the resource transaction history associated with the resource user.

3. The method of claim 1, further comprising determining that the resource user is a potential resource abuser by determining that the set of resource abuser criteria are not satisfied based on the resource transaction history but the set of potential resource abuser criteria are satisfied.

4. The method of claim 3, wherein the set of potential resource abuser criteria comprises occupying a resource for more than a portion of the continuous period of time without releasing the resource and utilizing the resource more than a second threshold percentage of the allowance of the resource, the second threshold percentage is lower than the threshold percentage.

5. The method of claim 3, wherein the set of potential resource abuser criteria further comprises the resource user has an updated address associated with a third party.

6. The method of claim 1, wherein the continuous period of time comprises at least 90 days.

7. The method of claim 1, wherein the threshold percentage of the allowance is equal to or higher than 50%.

8. The method of claim 1, wherein the set of resource abuser criteria further comprises occupying a second resource for more than the continuous period of time without releasing the second resource and utilizing the second resource more than the threshold percentage of an allowance of the second resource.

9. The method of claim 1, wherein at least one criteria of the set of potential resource abuser criteria is generated by relaxing a corresponding resource abuser criteria.

10. The method claim 1, further comprising:
generating a score for the resource user indicating a likelihood of the resource user becomes a resource abuser in a future time.

11. A secure resource management system, comprising:
a resource record repository configured for storing resource transaction histories associated with resource users; and
a resource abuser identification subsystem configured for performing operations comprising:
receiving, from a client computing system associated with a resource provider, a query for classifying a resource user associated with the resource provider;
determining a set of resource abuser criteria for classifying the resource user as a resource abuser, the set of resource abuser criteria comprising occupying a resource for more than a continuous period of time without releasing the resource and utilizing the resource more than a threshold percentage of an allowance of the resource, the allowance of the resource defining a maximum amount of the resource that the resource user is allowed to use;
determining that the resource user is not a resource abuser based on the set of resource abuser criteria;
responsive to the determination that the resource user is not a resource abuser, determining a set of potential resource abuser criteria for classifying the resource user as a potential resource abuser, wherein the set of potential resource abuser criteria is generated by adjusting a threshold of at least one of the set of resource abuser criteria such that the threshold of the at least one of the set of potential resource abuser criteria is lower than a corresponding threshold of one of the set of resource abuser criteria;
determining that the resource user is a potential resource abuser based on the set of potential resource abuser criteria and a resource transaction history associated with the resource user;
generating, responsive to the query, a response based on determining that the resource user is a potential resource abuser; and
transmitting the response to the client computing system, wherein the response is usable to cause access to the resource by the resource user to be restricted or denied.

12. The secure resource management system of claim 11, wherein the operations further comprise determining that the resource user is a potential resource abuser by determining that the set of resource abuser criteria are not satisfied based on the resource transaction history but the set of potential resource abuser criteria are satisfied.

13. The secure resource management system of claim 12, wherein the set of potential resource abuser criteria comprises occupying a resource for more than a portion of the continuous period of time without releasing the resource and utilizing the resource more than a second threshold percentage of the allowance of the resource, the second threshold percentage is lower than a third threshold percentage.

14. The secure resource management system of claim 12, wherein the set of potential resource abuser criteria further comprises the resource user has an updated address associated with a third party.

15. The secure resource management system of claim 11, wherein the continuous period of time comprises at least 90 days, or the threshold percentage of the allowance is equal to or higher than 50%.

16. A non-transitory computer-readable storage medium having program code that is executable by a processor device to cause a computing device to perform operations, the operations comprising:
determining a set of resource abuser criteria for classifying a resource user as a resource abuser or a potential resource abuser, the set of resource abuser criteria comprising occupying a resource for more than a continuous period of time without releasing the resource and utilizing the resource more than a threshold percentage of an allowance of the resource, the allowance of the resource defining a maximum amount of the resource that the resource user is allowed to use;
determining that the resource user is not a resource abuser based on the set of resource abuser criteria;
responsive to the determination that the resource user is not a resource abuser, determining a set of potential resource abuser criteria for classifying the resource user as a potential resource abuser, wherein the set of potential resource abuser criteria is generated by adjusting a threshold of at least one of the set of resource abuser criteria such that the threshold of the at least one of the set of potential resource abuser criteria is lower than a corresponding threshold of one of the set of resource abuser criteria;
determining that the resource user is a potential resource abuser based on the set of potential resource abuser criteria and a resource transaction history associated with the resource user;
generating, responsive to a query for classifying a resource user associated with a resource provider, a response based on determining that the resource user is a potential resource abuser; and
causing the response to be transmitted to a client computing system associated with the resource provider, wherein the response is usable to cause access to the resource by the resource user to be restricted or denied.

17. The non-transitory computer-readable storage medium of claim 16, wherein determining that the resource user is a potential resource abuser comprises determining that the set of resource abuser criteria are not satisfied based on the resource transaction history but the set of potential resource abuser criteria are satisfied.

18. The non-transitory computer-readable storage medium of claim 17, wherein the set of potential resource abuser criteria comprises occupying a resource for more than a portion of the continuous period of time without releasing the resource and utilizing the resource more than a second threshold percentage of the allowance of the resource, the second threshold percentage is lower than the threshold percentage.

19. The non-transitory computer-readable storage medium of claim 17, wherein the set of potential resource abuser criteria further comprises the resource user has an updated address associated with a third party.

20. The non-transitory computer-readable storage medium of claim 16, wherein the set of resource abuser criteria further comprises occupying a second resource for more than the continuous period of time without releasing the second resource and utilizing the second resource more than the threshold percentage of an allowance of the second resource.

\* \* \* \* \*